United States Patent [19]

Frantello

[11] 4,189,905
[45] Feb. 26, 1980

[54] ATTACHMENT FOR DRIVE SHAFT OF ROTARY LAWN MOWERS

[75] Inventor: Alfred A. Frantello, Satellite Beach, Fla.

[73] Assignee: Corinth Co. Inc., Satellite Beach, Fla.

[21] Appl. No.: 880,987

[22] Filed: Feb. 24, 1978

[51] Int. Cl.² ............................................. A01D 55/18
[52] U.S. Cl. ......................................... 56/295; 30/276; 56/12.7
[58] Field of Search .................... 56/295, 12.7; 30/276, 30/347; 242/157 R

[56] References Cited

U.S. PATENT DOCUMENTS

| | | | |
|---|---|---|---|
| 2,529,486 | 11/1950 | Clarkson et al. | 242/157 R |
| 2,706,096 | 4/1955 | Rufle | 242/157 R |
| 3,018,602 | 1/1962 | Diesterweg | 56/12.7 |
| 3,126,693 | 3/1964 | Renn | 56/364 |
| 3,343,351 | 9/1967 | Freedlander et al. | 56/295 |
| 3,601,960 | 8/1971 | Buechler | 56/295 |
| 4,043,103 | 8/1977 | Lakin et al. | 56/12.7 |
| 4,047,299 | 9/1977 | Bair | 56/12.7 |
| 4,077,191 | 3/1978 | Pittinger, Jr. et al. | 56/12.7 |
| 4,086,700 | 5/1978 | Inada | 56/295 |
| 4,104,796 | 8/1978 | Sheldon | 56/295 |

FOREIGN PATENT DOCUMENTS 2411602 10/1974 Fed. Rep. of Germany ............ 56/12.7

*Primary Examiner*—Louis G. Mancene
*Assistant Examiner*—Paul J. Hirsch

[57] ABSTRACT

A vertically extending attachment for the vertically extending drive-shaft of a rotary lawn mower, edger or trimmer comprises a centrally apertured flexible and longitudinally compressible spool which is encased within a rigid cylindrical sleeve of lesser length with a centrally apertured washer at each end which contacts the corresponding ends of the centrally apertured flexible and longitudinally compressible spool. An elongated centrally disposed adjustable bolt extends through the device with its upper end threaded for reception in the usual screw-threaded recess in the lower end of the aforementioned drive-shaft. A heavy duty monofilament or non-metallic cutting strand is wrapped around the aforementioned spool so as to provide at least two free-travelling ends which extend outwardly through relatively short radially disposed tubes which are mounted in evenly spaced alignment with communicating apertures in the sidewall of the rigid sleeve. The exterior of the rigid sleeve is preferably provided with air-agitating vanes. Two of such flexible and longitudinally compressible spools may be employed in tandem, to thus provide storage for greater length of cutting line.

5 Claims, 8 Drawing Figures

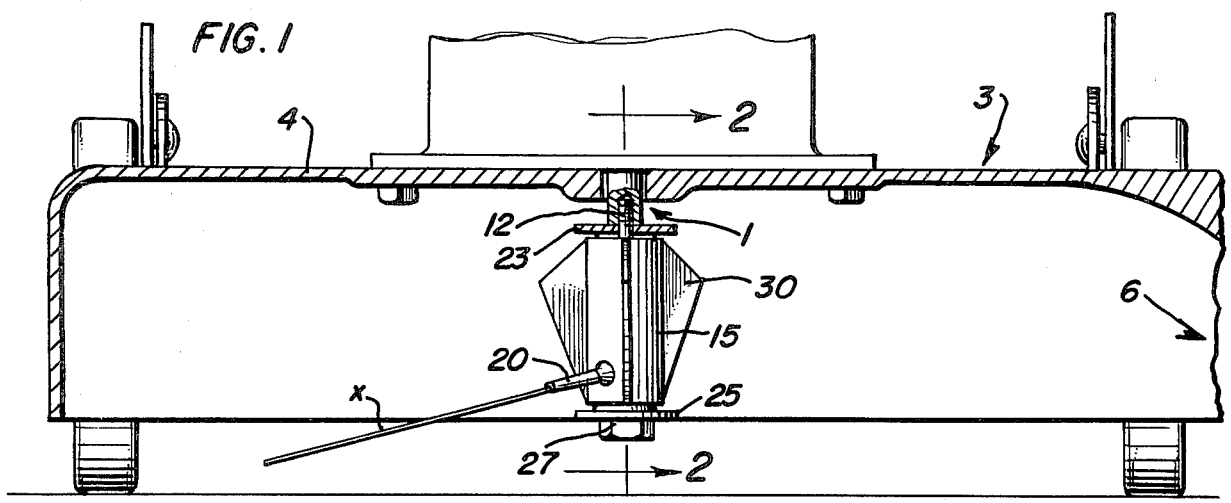
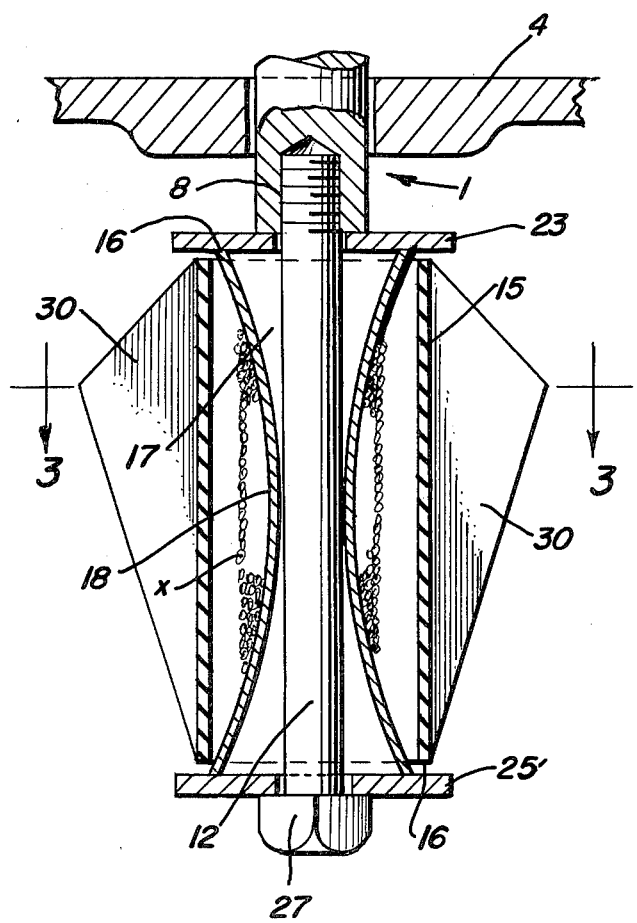
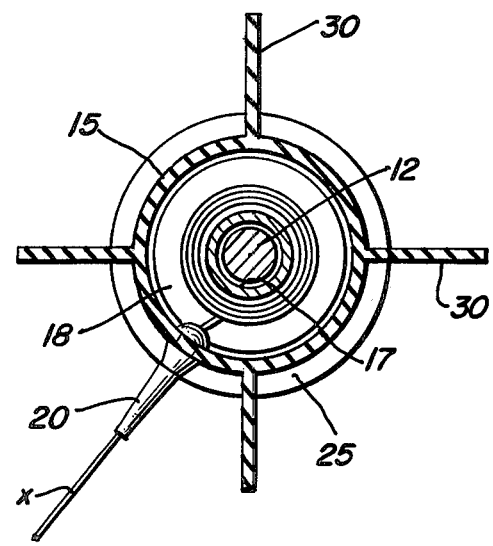

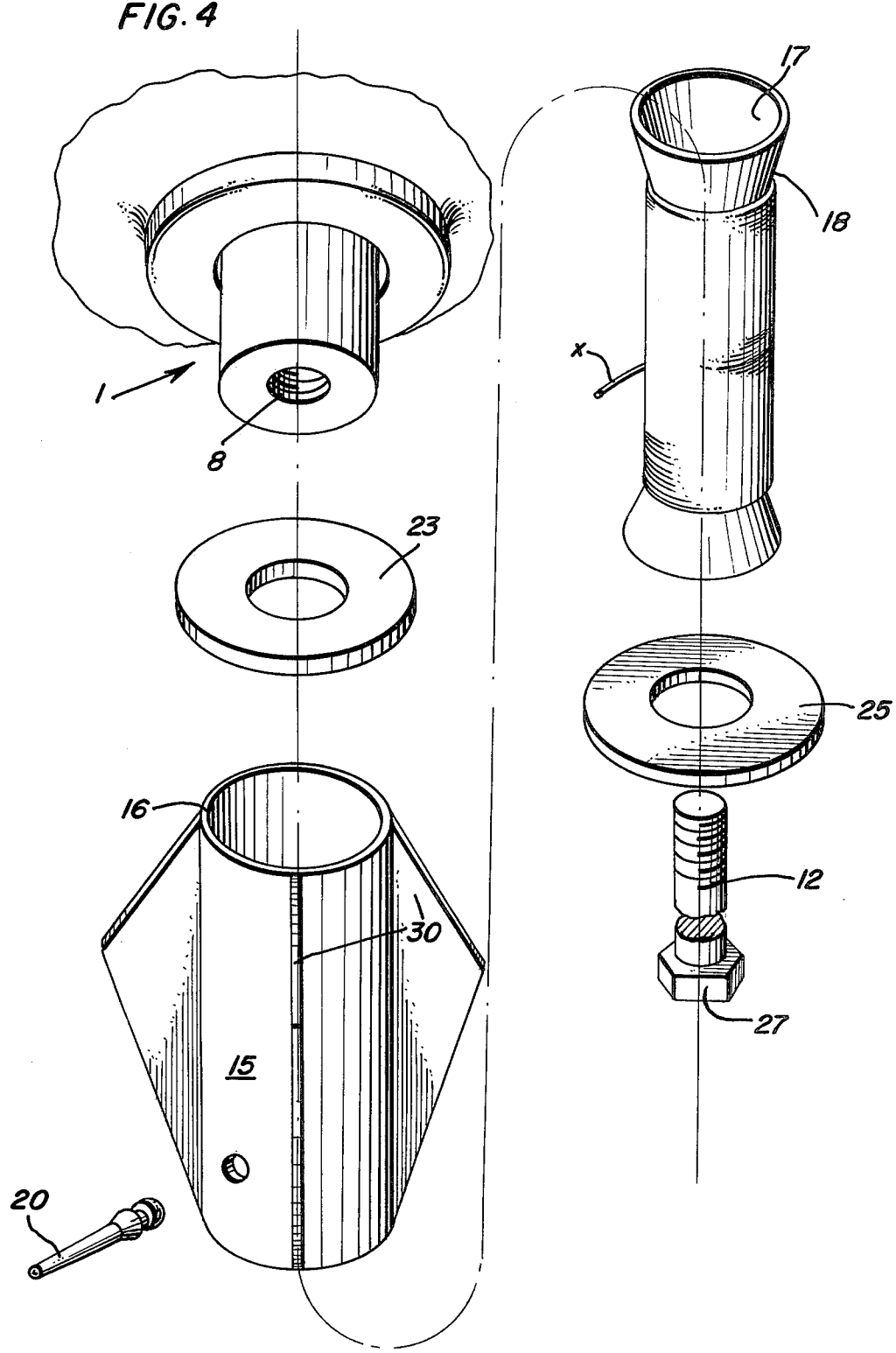

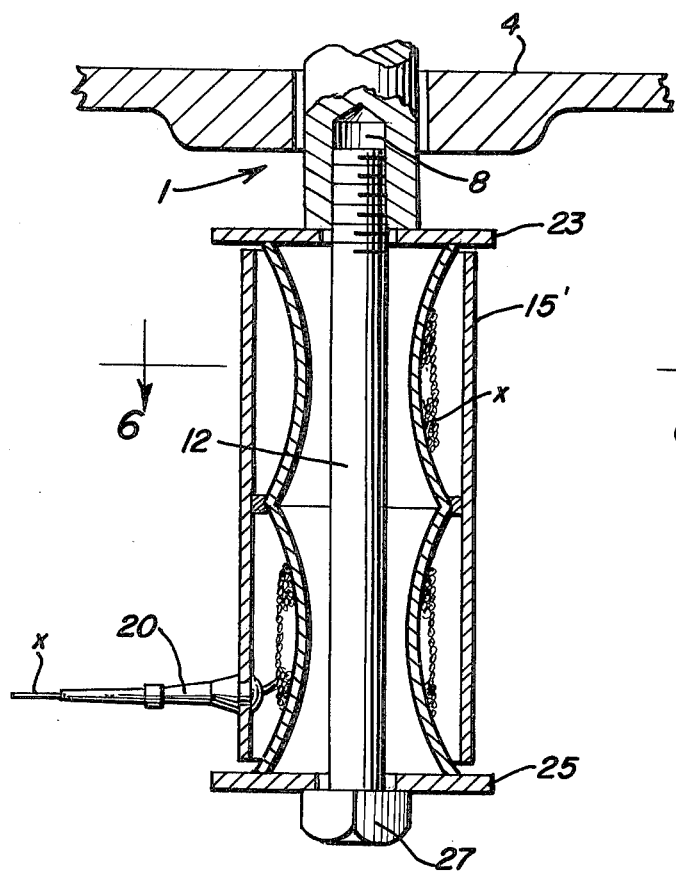
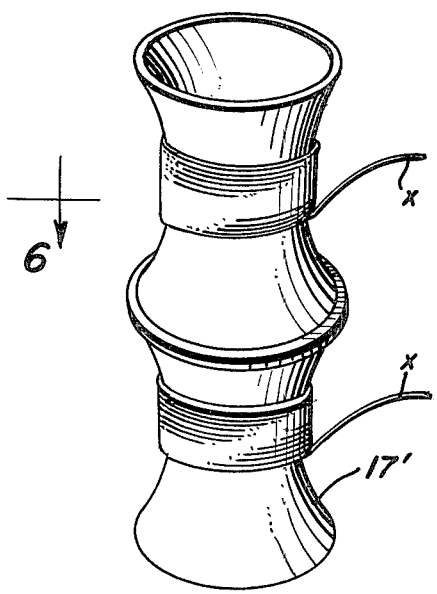
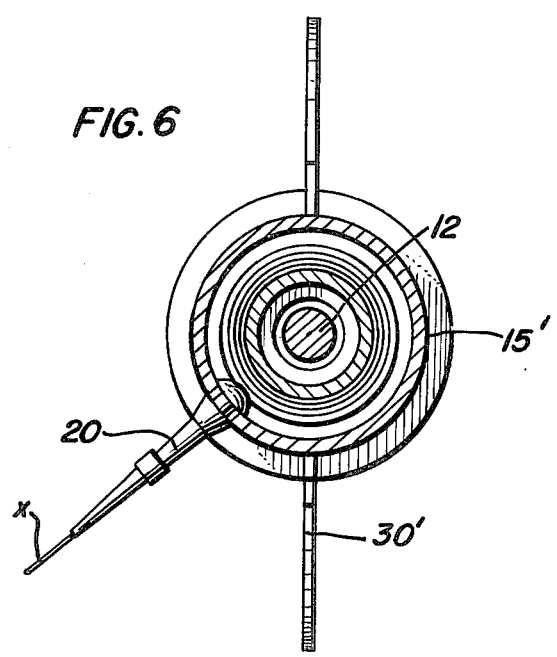
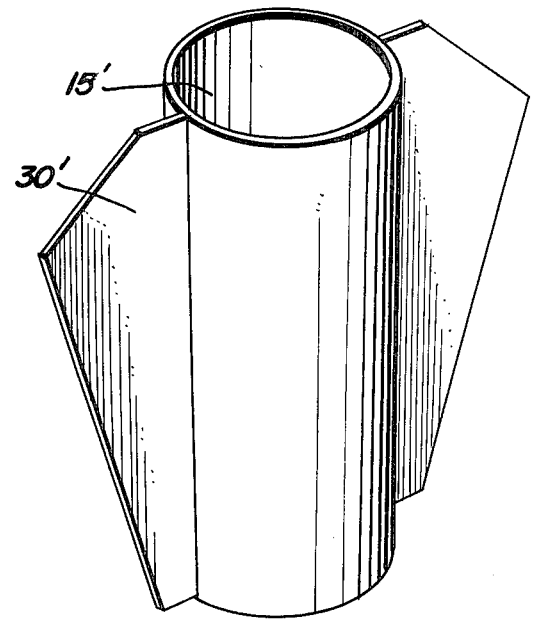

ATTACHMENT FOR DRIVE SHAFT OF ROTARY LAWN MOWERS

This invention relates to an improved device in the form of a rotary head for attachment to the lower end of the driving shaft of the motor (electric or internal combustion) of a conventional rotary lawn mower, edger, trimmer or the like, and principally readily portable hand-held type lawn mowing and edging tools.

Up until the past few years, the rotary head, or cutting blade, of rotary lawn mowers, edgers, and the like, have comprised a rotating metal bar or the like, usually with sharpened edges, which is rotated at sufficient speeds to effect cutting of grass, weeds, or the like. However, such rotating metal bars create and project dangerous missiles which may strike the operator or persons, animals or objects which are adjacent the machine.

Because of the dangerous conditions created by such a rotating head, most lawn edging and trimming around trees and the like, which would otherwise be damaged by the metal blades, either directly or indirectly, must be done manually; and this is both laborious and time consuming.

Certain developments are known which include lawn mowing or trimming devices comprising a disc-like head member arranged to be rotated by a suitable prime mower and containing a spool which is housed therein in coaxial alignment with the shaft of the motor. A length of flexible nonmetallic line, usually monofilament fishing line, is coiled about the spool, whereby a free traveling end will be swung acurately about to cut adjacent vegetation in the manner of a flail.

Certain of the prior art devices which utilize monofilament fishing line will cut or trim grass and other light vegetation with reasonable effectiveness, and possess the additional advantage that they are much safer to use than the more conventional metal-bar cutting blades in that they do not cause stones or other solid objects to be discharged in the dangerous manner earlier described and are almost completely incapable of causing any significant injury to persons, animals or objects which may be struck by the flailing cutting string.

On the other hand, the devices referred to immediately hereinbefore are subject to certain disadvantages of a magnitude which severely limit their practical value. In the first place, they are largely effective only to cut standing light-weight vegetation, being practically useless for any other purpose. Secondly, they will only cut such vegetation if growing relatively sparsely, and cannot effectively handle even light-weight vegetation if it is in a rank condition.

The light-weight plastic cutting lines of the prior art devices referred to are of relatively small diameter, and therefore are relatively incapable of cutting any but the lightest and sparsest vegetation.

The disadvantages of the prior art, and especially the aforementioned devices which utilize monofilament fishing line in the manner described are overcome by the present invention, and commercially acceptable embodiments of a vegetation cutter and the like are herein provided which are not only fully capable of cutting vegetation under most operating conditions, but which are also fully capable of other tasks completely beyond the capabilities of the prior art devices of the same general type: such as effectively cleaning dead leaves, trash and other such debris from along fences, walls, and the trunks or stems of trees and bushes. More importantly, however, is the fact that the embodiments of the present invention are capable of operation with a much lower breakage rate for their cutting strings, without any sacrifice whatsoever of the safety features and the cutting advantages which will be more fully described hereinafter.

Most of the various prior art attempts which have been made to overcome the aforementioned hazardous conditions created with rotating rigid-type metal cutting blades, involve the utilization of some type of flexible flail which possesses sufficient resiliency so as not to propel objects which are struck at high velocities.

However, resiliency itself is not sufficient to insure that the dangerous conditions will not be created when rotation is effected at necessary cutting speeds.

Another and great disadvantage of prior art cutting elements of the monofilament type described, is that they usually lack means for easy replaceability in the event of wearing out, of the monofilament. Most frequently the monofilament line is, and they are usually quite time-consuming and annoying to replace.

It is among the objects of the present invention to eliminate the difficulties which have been and still are experienced with the devices of the prior art as described herein, the invention providing a relatively simple device which very efficiently performs the desired cutting operation is while being quickly and easily adjustable, and one which may be quickly and easily substituted for the usual horizontally-extending metallic cutting bar of a conventional rotary lawn mower. Another object is the provision of a device possessing the foregoing advantages which is durable in service and which may be easily and inexpensively manufactured.

The foregoing and other objectives and advantages will become more readily understood from the following description and annexed drawings wherein like reference numerals designate like elements and wherein:

FIG. 1 is an elevational view partly in section, which illustrates the device of the invention as substituted for the horizontally extending blade member of an otherwise conventional rotary lawn mower.

FIG. 2 is an enlarged view, partly in section, which has been taken on the line 2—2 of FIG. 1.

FIG. 3 is a sectional view taken on the line 3—3 of FIG. 2.

FIG. 4 is an exploded view of the central elements of the showing of FIG. 2, as will be more fully described hereinafter.

FIG. 5 is a view which is similar in nature to that of FIG. 2, but illustrating a modification in the form of a dual-spool arrangement which provides for increased storage of monofilament line.

FIG. 6 is a sectional view taken along the line 6—6 of FIG. 5.

FIG. 7 is a perspective illustrating in further detail the dual-spool arrangement of FIG. 5, and FIG. 8 is a perspective of a further embodiment.

As shown in FIG. 1 of the drawings, the numeral 1 designates the lower end of the vertically disposed driven shaft of an internal combustion engine or electric motor of a rotary mower 3 which may be entirely conventional in design. As usual, the housing 4 of the rotary mower 3 is provided with an elevated opening or outlet 6 for discharging the cuttings of the mower, frequently into a bag which is connected thereto.

As in the case of practically all of the popular makes of rotary mower 3, the lower extremity of the driven-shaft 1 is provided with a screw-threaded recess 8 which is adapted to receive a relatively short bolt which secures the usual horizontally-extending metallic cutting bar in place (neither of which is shown herein).

According to the teachings of the present invention, the screw-threaded recess 8 in the lower extremity of the driven shaft 1 of the rotary mower receives, instead, the upper and screw-threaded end of an elongated bolt 12 for holding in place the novel spool which is to be substituted for the transversely extending metallic cutting bar of the earlier prior art described hereinbefore.

More specifically, the spool assembly of the present invention comprises an outer cylindrical body 15 of suitable rigid or inflexible material.

This outer cylindrical body 15 comprises centrally-apertured flattened ends 16; and the interior thereof is hollow and serves as a housing for a line-receiving cone-shaped flexible spool 17, the sidewall of which is continuously concave, as indicated at 18. As shown, the concavity 18 is on a single and unvarying radius.

A flexible tube 20 extends through the rigid outer cylindrical body 15 adjacent its lower end and communicates with the correspondingly adjacent portion of the continuously concave sidewall 18 of the flexible longitudinally compressible line-receiving spool 17. Another flexible tube 20 may be disposed directly opposite on the cylindrical body 15 or several or more in evenly spaced relationship; and the top of the rigid outer cylindrical body 15 of the novel spool assembly is shown as provided with a flat washer 23 which contacts the lowermost extremity of the driven shaft 1 of the motor and is provided with a central aperture through which the elongated bolt 12 extends, the upper end of the latter being screw-threaded, as earlier described, to be received in the screw-threaded recess 8 in the motor shaft.

In so doing, the elongated bolt 12 extends axially through the earlier described flexible longitudinally compressible line-receiving spool 17.

A similar flat washer 25 contacts the bottom of the rigid outer cylindrical body 15, and is provided with a central aperture through which the lower end of the elongated bolt 12 extends.

The lower most extremity of the elongated bolt 12 is provided with the usual bolt-head 27 which permits upward pressure against the bottom of the lower flat washer 25.

When the bolt-head 27 is tightened, and the bottom flat washer 25 is moved against the bottom of the rigid outer inflexible cylindrical body 15 and the bottom of the somewhat longer cone-shaped flexible longitudinally compressible line-receiving spool 17. When this is done the monofilament fishing line X passes through the flexible tube 20, and with the reduced friction effected thereby, the line will not receive excessive friction at this point of stress while the mower or trimming apparatus is in use.

As indicated in FIGS. 5 and 6, the flexible tubes 20 may be constructed of two separable parts in the manner of a valve stem for tubeless tires for automotive vehicles.

As the outer ends of the non-metallic line wear, replacement of those portions thereof is necessitated; and this has long been a very big problem with the prior art line-receiving spools of which I am presently aware; all of which require troublesome and time-consuming adjustment. In addition, the line-receiving spools of the prior art are unnecessarily complex and the cost of manufacture thereof unnecessarily high.

Due to the simplicity of the device of the present invention, when more line is needed, because of wear, etc., it is only necessary to slightly loosen the bolt-head 27, which will enable the rigid outer cylindrical body 15 to become loose enough to similarly loosen the cone-shaped flexible spool 17, and permit the line X to be manually pulled through the latter to the extent desired.

After this, the bolt-head 27 is again tightened and the device is ready for immediate reuse.

It has been found that with the relatively small diameter of the rigid outer cylindrical body 15, which is actually very little larger than that of the driven shaft 1 of the motor, there is not as much air to drive the clippings from the device and out of the elevated opening or outlet 6 in the housing of the rotary mower than is desirable.

In improving this situation I have found it highly successful to dispose a series of equally spaced substantially vertically extending air-agitating vanes 30 on the exterior of the rigid outer cylindrical body 15.

These air vanes 30 are shown as tapering from top to bottom, and are preferably disposed at an angle to the axis of the rigid outer cylindrical body 15; for example 22.5 degrees, although this may be increased or decreased as desired, and depending to some extent on the interior design of the housing of the rotary mower.

As earlier indicated, the device of the invention, as described herein, and shown in the drawings, is not only highly efficient and durable in service, but is so simple as to lend itself to ease and inexpensiveness of manufacture, whereby it can find a ready market for application to existing rotary mowers or trimmers, as well as comprise part of the original equipment if such is desired.

In FIGS. 5, 6 and 7 a modified form of the invention is shown as comprising a somewhat vertically elongated rigid outer cylindrical body 15' with correspondingly dimensioned elements which are disposed therewithin. The previously described cone-shaped flexible spool 17 is replaced by a pair of such spools 17' in vertical alignment, in which case the flexible line X may be paid-out from the two spools 17' simultaneously, as indicated in FIG. 7 and threaded through two opposed flexible tubes 20.

Just by tipping the lawn mower on its side twenty degrees will enable this line to be inserted within the flexible tube. This enables all line to be in use to conserve waste and also enables the device to work in an efficient manner. Referring to FIG. 5 and FIG. 6 the flexible stems 20 being in two separable parts, as previously mentioned, is helpful because whenever the operator runs out of line coming from the spool the construction will enable the extension to be unscrewed from the flexible stem. Then a knotted short piece of line inserted into the extension shown as at X FIG. 7 is then screwed back onto the flexible stem for continued cutting. The knotted end enables the line to be permanently inserted therein until replacement is needed.

In FIGS. 6 and 8 the rigid outer cylindrical body 15' is shown as provided with but two opposed air vanes 30' which are of somewhat modified design.

Having thus described the invention, what I claim as new and desire to secure by Letters Patent is:

1. An attachment for the vertically-extending drive shaft of a rotary lawn mower, edger or trimmer comprising, in combination (a) a centrally apertured, flexible and longitudinally compressible spool;
(b) a rigid cylindrical housing of shorter length for said spool;
(c) upper and lower centrally apertured washers for contacting the corresponding ends of said spool and said rigid cylindrical housing;
(d) an elongated centrally disposed adjustable bolt extending through said spool, housing and washers and adapted for screw-threaded reception in a screw threaded recess in the lower end of the drive shaft; and
(e) a heavy-duty filament-type cutting strand wrapped around the spool so as to provide at least two free-travelling ends which extend outwardly through relatively short radially disposed tubes which are mounted on the periphery of said rigid cylindrical housing and in evenly spaced alignment with communicating apertures in the sidewall of said rigid cylindrical housing;
(f) the diameter and composition of said centrally apertured, flexible and longitudinally compressible spool being such as to permit the adjustment of said bolt and washers to preclude rotative movement between said spool and said rigid cylindrical housing.

2. The combination of claim 1, together with a plurality of air-agitating vanes disposed on the exterior of said rigid cylindrical sleeve.

3. The combination of claim 1, together with a plurality of generally vertically extending air-agitating vanes on the exterior of said rigid cylindrical sleeve.

4. An attachment for the drive shaft of a rotary lawn mower comprising, in combination, a rigid cylindrical sleeve, an adjustably lengthwise compressible spool of slightly greater length disposed in said rigid cylindrical sleeve, a supply of filament-type cutting line carried by said spool, said rigid cylindrical sleeve having at least one aperture in the sidewall thereof, and a tube communicating with and projecting externally from the aforementioned aperture, whereby the outer end of said line may be threaded through and made to adjustably project from the outer end of said tube.

5. The attachment of claim 4 wherein air-agitating vanes are provided on the periphery of said rigid cylindrical sleeve.

* * * * *